United States Patent [19]

Kawahara et al.

[11] Patent Number: 4,972,675
[45] Date of Patent: Nov. 27, 1990

[54] HYDRAULICALLY OPERATED CONTINUOUSLY VARIABLE TRANSMISSION

[75] Inventors: Eiichiro Kawahara; Takashi Iino; Yoshihiro Katagiri; Yasuhiro Sawa, all of Saitama, Japan

[73] Assignee: Honda Giken Kogyo Kabushiki Kaisha, Tokyo, Japan

[21] Appl. No.: 414,110

[22] Filed: Sep. 28, 1989

[30] Foreign Application Priority Data

Sep. 28, 1988 [JP] Japan ................................ 63-242859

[51] Int. Cl.$^5$ ............................................. F16D 39/00
[52] U.S. Cl. ......................................... 60/488; 60/487
[58] Field of Search ................. 60/468, 487, 488, 489, 60/494

[56] References Cited

U.S. PATENT DOCUMENTS

| | | | |
|---|---|---|---|
| 4,341,133 | 7/1982 | Sakamoto | 60/487 |
| 4,754,603 | 7/1988 | Rosman | 60/488 |
| 4,779,417 | 10/1988 | Kita | 60/488 |
| 4,838,024 | 6/1989 | Yamamoto et al. | 60/487 |
| 4,850,192 | 7/1989 | Mitsumasa et al. | 60/487 |
| 4,887,428 | 12/1989 | Iino | 60/487 |
| 4,916,901 | 4/1990 | Hayash et al. | 60/487 |

*Primary Examiner*—Ronald C. Capossela
*Attorney, Agent, or Firm*—Lyon & Lyon

[57] ABSTRACT

A hydraulically operated continuously variable transmission comprises a hydraulic pump and a hydraulic motor having a motor cylinder including an integral tubular member. A distribution disc is coupled to the motor cylinder at one end of the tubular portion and has oil passages communicating with the hydraulic pump and the hydraulic motor. A hollow fixed shaft is inserted in the tubular member, and a distribution ring is axially movably mounted on the fixed shaft and has an end face slidably held against the distribution disc. A mechanical seal assembly includes an annular rotatable seal member rotatably disposed in the tubular member, and an annular fixed seal member axially movably, but nonrotatably, mounted on the fixed shaft. A compression spring is disposed between the fixed seal member and the distribution ring and is resiliently extensible for applying a preload to abut an axial end face of the fixed seal member against an axial end face of the rotatable seal member and a preload to abut the end face of the distribution ring against the distribution disc.

5 Claims, 4 Drawing Sheets

HYDRAULICALLY OPERATED CONTINUOUSLY VARIABLE TRANSMISSION

BACKGROUND OF THE INVENTION

The present invention relates to a hydraulically operated continuously variable transmission comprising a hydraulic pump and a hydraulic motor, and more particularly to a hydraulically operated continuously variable transmission which includes a hydraulic pump and a hydraulic motor that are hydraulically connected to each other by a closed hydraulic circuit defined in a motor cylinder which includes a tubular portion incorporating an end sealing seal assembly.

Heretofore, continuously variable transmissions comprising a hydraulic pump and a hydraulic motor are known in the art, and employed in various applications. For example, Japanese Patent Publication Nos. 32(1957)-7159 and 56(1981)-50142 disclose a continuously variable transmission having an input shaft to which a fixed-displacement hydraulic pump is connected, an output shaft to which a variable-displacement hydraulic motor is connected, and a closed hydraulic circuit through which oil discharged from the hydraulic pump is delivered to the variable-displacement hydraulic motor for thereby actuating the hydraulic motor to rotate the output shaft.

In such a continuously variable transmission, it is known to provide a seal assembly between a motor cylinder and a fixed shaft as disclosed in Japanese Laid-Open Patent Publication No. 62(1987)-37563. The fixed shaft is inserted in a tubular portion of the motor cylinder, and the interior of the tubular portion is divided into inner and outer spaces by a distribution ring attached to the fixed shaft. These inner and outer spaces provide a closed hydraulic circuit by which the pump and the motor are hydraulically connected to each other. The seal assembly serves to prevent oil from leaking from the closed hydraulic circuit, so that the volumetric efficiency of the pump will not be reduced.

The seal assembly is known as a mechanical seal which comprises a rotatable seal member mounted on the tubular portion, and a fixed seal member mounted on the fixed shaft, the rotatable and fixed seal members having respective end faces held in slidable contact with each other to seal the closed hydraulic circuit. A slight clearance is usually defined between the contacting end faces of the seal members so that the pressure under which the end faces are held in contact with each other can be regulated under the pressure of oil which is to be sealed in the closed hydraulic circuit.

If the clearance were selected to be excessively large, then a large amount of oil would leak through the clearance when the oil pressure in the closed hydraulic circuit is low, resulting in a reduction in the volumetric efficiency. Conversely, if the clearance were selected to be too small, then the contacting end faces would run short of oil film therebetween when the oil pressure in the closed hydraulic circuit is high, with the result that seizure would be caused between the end faces of the seal members.

To avoid the above drawback, the clearance may be dimensioned so that it is of a certain large size, and a spring may be used which can maintain the end faces of the rotatable end fixed seal members in mutually contacting relationship. In order for the spring to preload the end faces under a substantially constant pressure, the spring is required to be of a certain length, and a space for accommodating the spring must be provided.

SUMMARY OF THE INVENTION

In view of the aforesaid shortcomings of the conventional hydraulically operated continuously variable transmissions, it is an object of the present invention to provide a hydraulically operated continuously variable transmission which includes a seal structure that will prevent oil leakage and seizure-induced wear irrespective of the magnitude of an oil pressure developed therein, thus reliably sealing a tubular portion of a motor cylinder in which a closed hydraulic circuit is defined.

According to the present invention, there is provided a hydraulically operated continuously variable transmission comprising an input shaft, a hydraulic pump coupled to the input shaft, an output shaft, a hydraulic motor coupled to the output shaft, a closed hydraulic circuit hydraulically interconnecting the hydraulic pump and the hydraulic motor such that the hydraulic motor can be driven by hydraulic forces from the hydraulic pump, the hydraulic motor having a motor cylinder including an integral tubular member, a distribution disc coupled to the cylinder at one end of the tubular portion and having oil passages defined therein and communicating with the hydraulic pump and the hydraulic motor, a hollow fixed shaft inserted in the tubular member, a distribution ring axially movably mounted on the fixed shaft and having an end face held in slidable contact with the distribution disc, the distribution ring dividing the hollow space in the tubular member into an inner space inside of the fixed shaft and an outer space outside of the fixed shaft, the inner and outer spaces being part of the closed hydraulic circuit, an annular rotatable seal member of end-face seal type rotatably disposed in the other end of the tubular member and extending around the fixed shaft, an annular fixed seal member disposed adjacent to an axial end face of the rotatable seal member and axially movably mounted on and extending around the fixed shaft, and a compression spring disposed between the fixed seal member and the distribution ring and resiliently extensible for applying a preload to abut and axial end face of the fixed seal member against the axial end face of the rotatable seal member and a preload to abut the end face of the distribution ring against the distribution disc.

Even when the mechanical seal structure is dimensioned such that a sufficient clearance may be established between the rotatable and fixed seal members, since the confronting end faces of the rotatable and fixed seal members are pressed against so as to come in contact with each other under a constant force by the compression spring, the mechanical seal structure provides a leakage-free reliable seal even if the oil pressure in the closed hydraulic circuit is low. The mechanical seal structure is dimensioned to provide a sufficient clearance between the rotatable and fixed seal members. Therefore, no oil film shortage occurs between the rotatable and fixed seal members even if the oil pressure in the closed hydraulic circuit is high. The compression spring also serves to preload the distribution ring. Stated otherwise, the spring which is used to preload the distribution ring also exerts a preload to the seal members.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
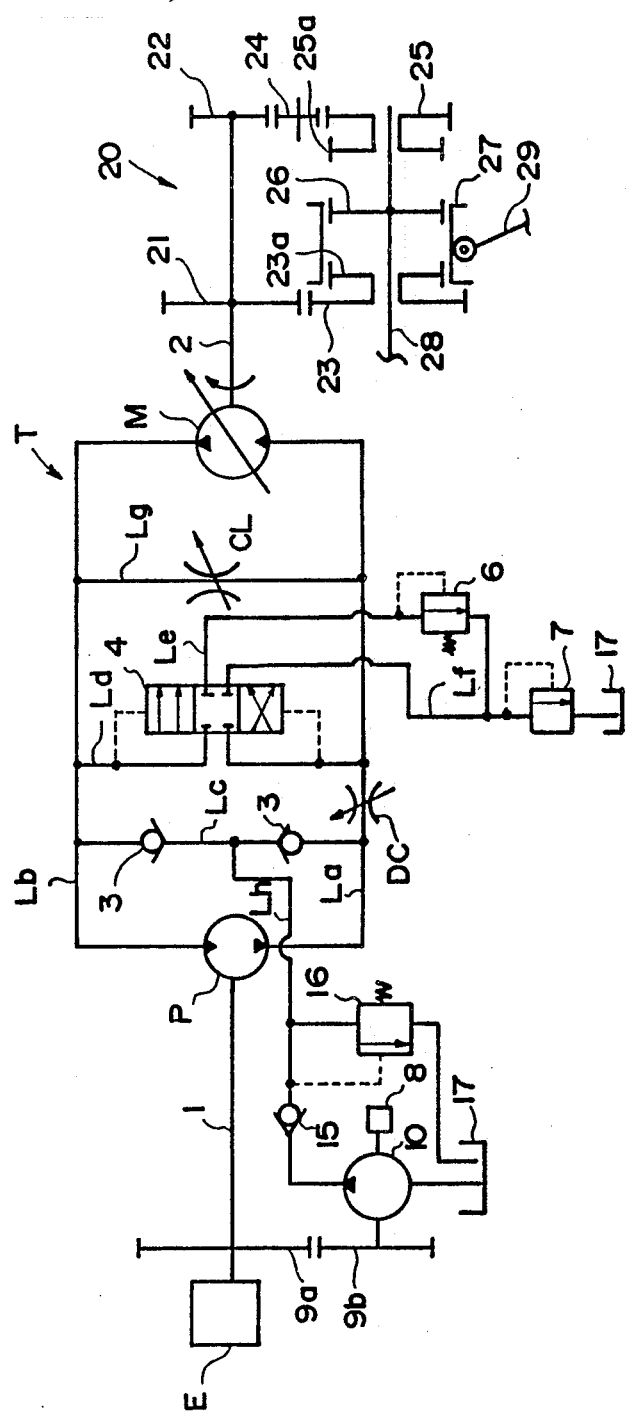
FIG. 1 is a hydraulic circuit diagram of a hydraulically operated continuously variable transmission according to the present invention.

FIG. 1 shows the hydraulic circuit of a hydraulically operated continuously variable transmission according to the present invention, for use on a motor vehicle. The continuously variable transmission, generally designated by T, has a fixed-displacement swash-plate axial-plunger hydraulic pump P which can be driven by an engine E through an input shaft 1, and a variable-displacement swash-plate axial-plunger hydraulic motor M which can drive road wheels (not shown) of the motor vehicle through an output shaft 2 and a forward-/reverse selector unit 20. The hydraulic pump P and the hydraulic motor M are interconnected by a closed hydraulic circuit which has a first oil passage La interconnecting the outlet port of the pump P and the inlet port of the motor M and a second oil passage Lb interconnecting the inlet port of the pump P and the outlet port of the motor M. The first oil passage La is supplied with oil under higher pressure and the second oil passage Lb is supplied with oil under lower pressure when the pump P is driven by the engine E and the motor M is rotated by the oil pressure from the pump P to drive the road wheels, i.e., when the road wheels are driven by the engine E through the continuously variable transmission T. The second oil passage Lb is supplied with oil under higher pressure and the first oil passage La is supplied with oil under lower pressure when the motor vehicle is subjected to engine braking due to drive forces from the road wheels such as when the motor vehicle is decelerated.

The first oil passage La has a direct clutch valve DC for selectively cutting off an oil flow through the first oil passage La.

A charging pump 10 drivable by the engine E through a pair of intermeshing drive and driven gears 9a, 9b has an outlet port connected to the closed hydraulic circuit through a charging oil passage Lh having a check valve 15 and a third oil passage Lc having a pair of check valves 3. Working oil pumped from an oil sump 17 by the charging pump 10 and regulated in pressure by a charging pressure relief valve 16 is supplied to a lower-pressure one of the oil passage La, Lb through the check valves 3.

A governor valve 8 is coupled coaxially to the drive shaft of the charging pump 10. The governor valve 8 is supplied with working oil under a pressure from a control valve (not shown), and converts the pressure of the supplied working oil to a governor oil pressure corresponding to the rotational speed of the engine E. Input and output oil passages joined to the governor valve 8 are omitted from illustration in FIG. 1.

A fourth oil passage Ld having a shuttle valve 4 is connected to the closed hydraulic circuit. To the shuttle valve 4, there are connected fifth and sixth oil passages Le, Lf having higher- and lower-pressure relief valves 6, 7, respectively, and connected to the oil sump 17. The shuttle valve 4 comprises a two-port three-position directional control valve which is operable depending on the pressure difference between the first and second oil passages La, Lb to connect a higher-pressure one of the first and second oil passages La, Lb to the fifth oil passage Le and also to connect the lower-pressure oil passage to the sixth oil passage Lf. The oil pressure of the higher-pressure one of the first and second oil passages La, Lb is regulated by the higher-pressure relief valve 6, whereas the oil pressure of the lower-pressure one of the first and second oil passages La, Lb is regulated by the lower-pressure relief valve 7.

The first and second oil passages La, Lb are interconnected by a seventh oil passage Lg having a main clutch valve CL which comprises a variable restriction for controlling the opening of the seventh oil passage Lg.

A final output shaft 28 extends parallel to the output shaft 2 of the hydraulic motor M, with the forward-/reverse selector unit 20 being disposed between the shafts 2, 28. The forward/reverse selector unit 20 comprises axially spaced first and second drive gears 21, 22 mounted on the output shaft 2, a first driven gear 23 rotatably supported on the final output shaft 28 and meshing with the first drive gear 21, a second driven gear 25 rotatably supported on the final output shaft 28 and meshing with the second drive gear 22 through an idle gear 24, a clutch hub 26 fixedly mounted on the final output shaft 28 and positioned axially between the first and second drive gears 23, 26, first and second clutch gears 23a, 25a joined to axial sides of the first and second driven gears 23, 25, respectively, and an axially slidable sleeve 27 for selectively connecting the clutch hub 26 to the clutch gear 23a or 25a. The sleeve 27 has an internal gear which can selectively mesh with the external gear of the clutch hub 26 and the clutch gears 23a, 25a. The sleeve 27 is axially movable by a shift fork 29 coupled thereto. The forward/reverse selector unit 20 is specifically shown in FIG. 2.

When the sleeve 27 is moved to the left by the shift fork 29, it interconnects the clutch gear 23a and the clutch hub 26. At this time, the final output shaft 28 is rotated in the opposite direction to the output shaft 2, so that the road the road wheels are rotated in a forward direction by the continuously variable transmission T. When the sleeve 27 is moved to the right by the shift fork 29, thus interconnecting the clutch gear 25a and the clutch hub 26, the final output shaft 28 is rotated in the same direction as the output shaft 2. Therefore, the road wheels are rotated in a reverse direction.

The continuously variable transmission T will now be described in greater detail with reference to FIG. 2.

The continuously variable transmission T has first, second, third, and fourth cases 5a, 5b, 5c, 5d defining a space therein in which the hydraulic pump P and the hydraulic motor M are coaxially disposed. The input shaft 1 of the hydraulic motor P is coupled to the output shaft Es of the engine E through a coupling 1a. A centrifugal filter 50 is positioned radially inwardly of the coupling 1a.

The drive gear 9a is splined to the input shaft 1, and the driven gear 9b is coaxially connected to the drive shaft 11 of the charging pump 10. Therefore, the rotative power of the engine E is transmitted through the gears 9a, 9b to the drive shaft 11 of the charging pump 10, thus actuating the charging pump 10. The drive shaft 11 projects through the charging pump 10 remotely from the gear 9b, and is coupled to the governor valve 8. Therefore, the rotative power of the engine E is also transmitted to the governor valve 8, which generates a governor oil pressure corresponding to the rotational speed of the engine E.

The hydraulic pump P comprises a pump cylinder 60 splined to the input shaft 1 and having a plurality of cylinder bores or holes 61 defined in the pump cylinder 60 at circumferentially equally spaced intervals, and a plurality of pump plungers 62 slidably fitted respectively in the cylinder holes 61. The hydraulic pump P can be driven by the power of the engine E which is transmitted through the input shaft 1.

The hydraulic motor M comprises a motor cylinder 70 disposed around the pump cylinder 60 and having a plurality of cylinder bores or holes 71 defined in the motor cylinder 70 at circumferentially equally spaced intervals, and a plurality of motor plungers 72 slidably fitted respectively in the cylinder holes 71. The hydraulic motor M is rotatable coaxially relatively to the pump cylinder 70.

Figure 3:
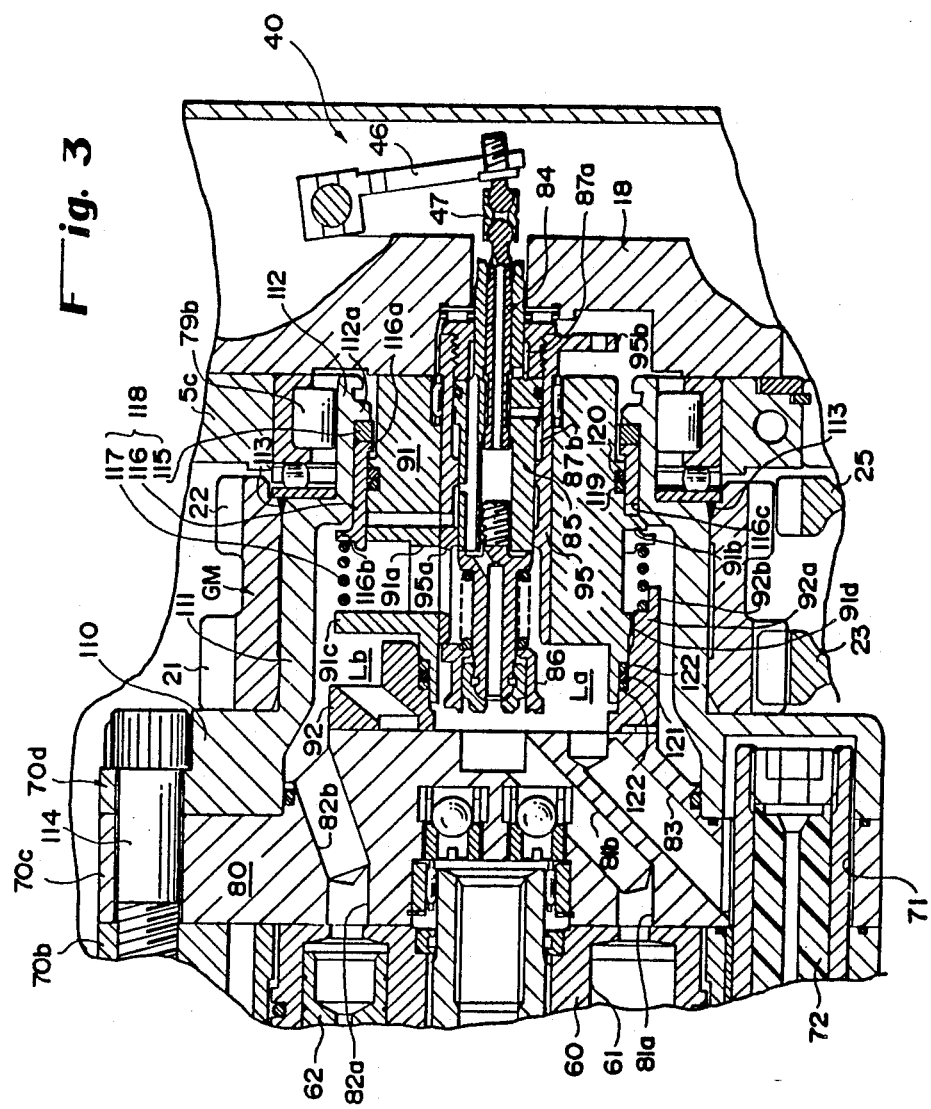
FIG. 3 is an enlarged fragmentary cross-sectional view of the continuously variable transmission.

The motor cylinder 70 comprises first, second, third, and fourth cylinder segments 70a, 70b, 70c, 70d which are arranged axially and joined together. The first segment 70a is rotatably supported at its lefthand end in the case 5b by a bearing 79a. The righthand end of the first segment 70a serves as a pump swash plate member inclined with respect to the input shaft 1. A pump swash plate ring 63 is mounted on the inner surface of the pump swash plate member. The cylinder holes 71 are defined in the second segment 70b. The third segment 70c has a distribution disc 80 in which there are defined oil passages leading to the cylinder holes 61, 71. As shown in FIG. 3, the fourth segment 70d comprises a flange 110, a first tubular portion 111, and a second tubular portion 112. The flange 110 is fastened to the third segment 70c by a bolt 114. The first and second drive gears 21, 22 are formed on a gear member GM which is force-fitted over the first tubular portion 111. The second tubular portion 112 is rotatably supported in the case 5c by a bearing 79b.

An annular pump shoe 64 (FIG. 2) is slidably rotatably mounted on the pump swash plate ring 63. The pump shoe 64 and the pump plungers 62 are operatively connected to each other through joint rods 65 which are swingable with respect to the pump shoe 64 and the pump plungers 62. The pump shoe 64 and the pump cylinder 60 have bevel gears 68a, 68b, respectively, which are held in mesh with each other. When the pump cylinder 60 is rotated by the input shaft 1, the pump shoe 64 is also rotated in the same direction, and the pump plungers 62 are reciprocally moved over strokes depending on the angle of inclination of the pump swash plate ring 63 for thereby drawing oil from the inlet port of the hydraulic pump P and discharging oil to the outlet port thereof.

Figure 2:
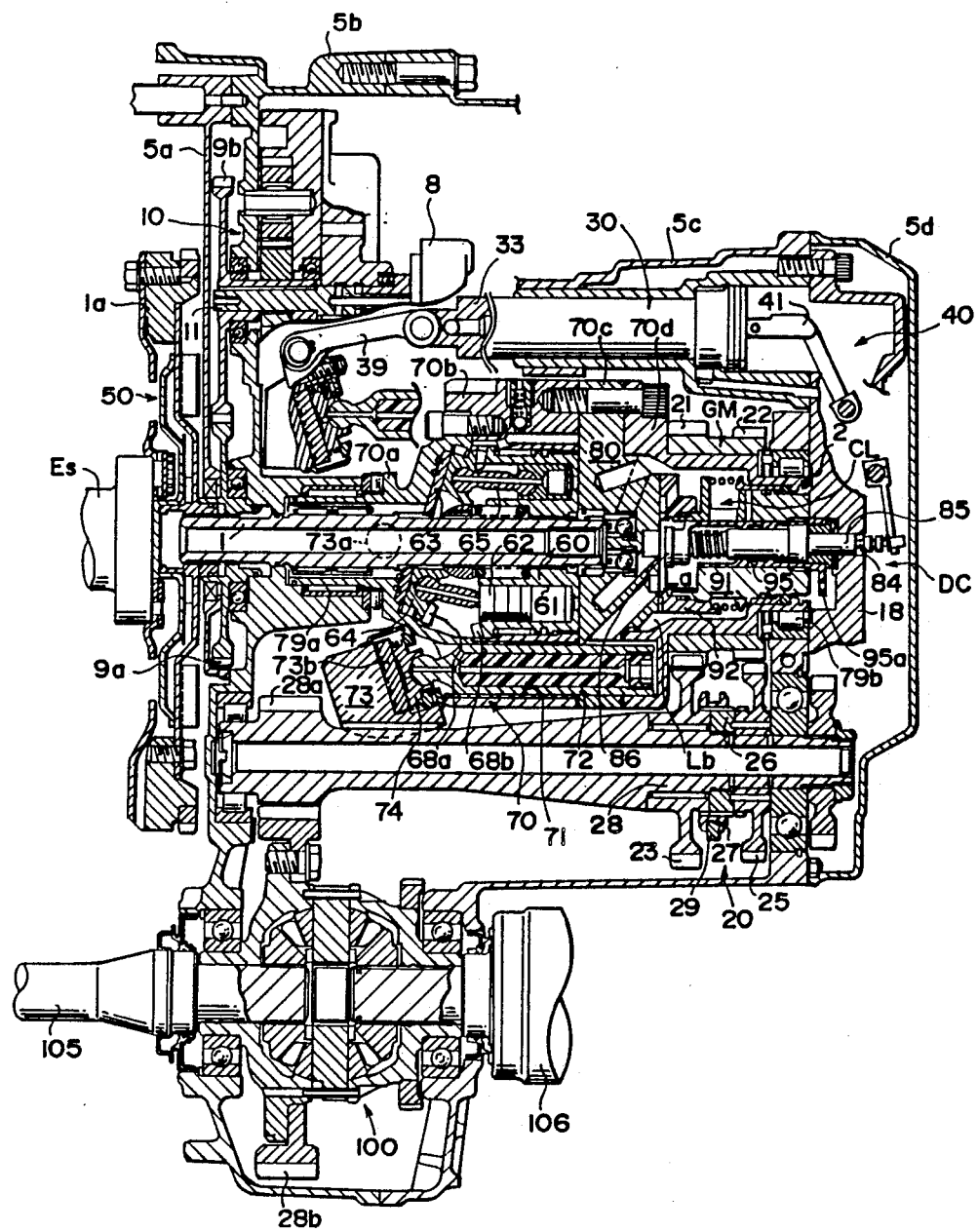
FIG. 2 is a cross-sectional view of the continuously variable transmission.

A swash plate member 73 confronting the motor plungers 72 is swingably supported in the second case 5b by a pair of trunnions (pivot shafts) 73 in a direction normal to the sheet of FIG. 2. A motor swash plate ring 73b is mounted on the surface of the swash plate member 73 which faces the motor plungers 72. A motor shoe 74 is slidably disposed on the motor swash plate ring 73b. The motor shoe 74 is relatively swingably connected to confronting ends of the motor plungers 72. The swash plate member 73 is coupled to a piston rod 33 of a transmission servo unit 30 through a link 39 at a position remote from the trunnions 73a. When the piston rod 33 is axially moved by the transmission servo unit 30, the swash plate member 73 is angularly moved about the trunnions 73a.

The fourth segment 70d of the motor cylinder 70 is of a hollow construction in which a fixed shaft 91 secured to a pressure distribution plate 18 is inserted. A distribution ring 92 is fitted in a fluid-tight manner over the lefthand end of the fixed shaft 91. The distribution ring 92 has an axial lefthand end face held in slidable contact with the distribution disc 80 in eccentric relation thereto. The distribution ring 92 divides the hollow space in the fourth segment 70d into an inner oil chamber and an outer oil chamber. The inner oil chamber serves as the first oil passage La, and the outer oil chamber serves as the second oil passage Lb. The pressure distribution plate 18 has the shuttle valve 4 and the higher- and lower-pressure relief valves 6, 7. The pressure distribution plate 18 is attached to a righthand side surface of the third case 5c, and covered by the fourth case 5d.

The distribution disc 80 and the structure in the fourth segment 70d are shown in detail in FIG. 3.

The distribution disc 80 has a pump outlet port 81a and a pump inlet port 82a. The cylinder holes 61 in which the pump plungers 62 are operating in a discharge stroke are held in communication with the first oil passage La through the pump outlet port 81a and a discharge passage 81b connected thereto. The cylinder holes 61 in which the pump plungers 62 are operating in a suction stroke are held in communication with the second oil passage Lb through the pump inlet port 82a and a suction passage 82b connected thereto. The distribution disc 80 also has communication passages 83 communicating with the cylinder holes (cylinder chambers) 71 in which the respective motor plungers 72 are slidably disposed. The open ends of the communication passages 83 are selectively brought by the distribution ring 92 into communication with the first oil passage La or the second oil passage Lb depending on the rotation of the motor cylinder 70. The cylinder holes 71 receiving the motor plungers 72 in an expansion stroke are held in communication with the first oil passage La through the communication passages 83, whereas the cylinder holes 71 receiving the motor plungers 72 in a contraction stroke are held in communication with the second oil passage Lb through the communication passages 83.

The closed hydraulic circuit is defined between the hydraulic pump P and the hydraulic motor M through the distribution disc 80 and the distribution ring 92. When the pump cylinder 60 is driven by the input shaft 1, higher-pressure working oil produced by the pump plungers in the discharge stroke flows from the pump outlet port 81a through the pump discharge passage 81b, the first oil passage La, and those communication passages 83 which communicate with the first oil passage La into those cylinder holes 71 which receive the motor plungers 72 in the expansion stroke, thus applying a thrusting force to these motor plungers 72. Working oil discharged from those motor plungers which are in the contraction stroke flows through those communication passages 83 which communicate with the second oil passage Lb, the pump suction passage 82b, and the pump inlet port 82a into the cylinder holes 61 receiving those pump plungers 62 which are in the suction stroke.

Upon such circulation of the working oil, the motor cylinder 70 is rotated by the sum of the reactive torque which is given to the motor cylinder 70 through the pump swash plate ring 63 by the pump plungers 62 in the discharge stroke and the reactive torque which is received from the motor swash plate member 73 by the motor plungers 72 in the expansion stroke.

The transmission ratio, or speed reduction ratio, of the motor cylinder 70 to the pump cylinder 60 is given by the following equation:

$$\text{Transmission ratio} = \frac{\text{Rotational speed of the pump cylinder 60}}{\text{Rotational speed of the motor cylinder 70}}$$
$$= 1 + \frac{\text{Displacement of the hydraulic motor } M}{\text{Displacement of the hydraulic pump } P}$$

As in apparent from the above equation, the transmission ratio can be varied from 1 (minimum value) to a certain necessary value (maximum value) by angularly moving the swash plate member 73 with the transmission servo unit 30 to vary the displacement of the hydraulic motor M from zero to a certain value.

As described above, the gear member GM with the first and second drive gears 21, 22 is force-fitted over the fourth segment 70d of the motor cylinder 70. Therefore, the rotative drive force from the motor cylinder 70 is transmitted through the forward/reverse selector unit 20 to the final output shaft 28. The final output shaft 28 is connected through final gears 28a, 28b (FIG. 2) to a differential 100. Accordingly, the rotative drive force from the final output shaft 28 is transmitted to the differential 100. The rotative drive force is then split by the differential 100 and transmitted to a pair of drive axles 105, 106 which drive the road wheels (not shown) connected respectively thereto.

The fixed shaft 91 inserted in the fourth segment 70d has a bypass passage interconnecting the first and second oil passages La, Lb. The main clutch valve CL, which controls the opening of the bypass passage from a fully closed condition to a fully open condition, and the direct clutch valve DC, which selectively blocks off the first oil passage La, are disposed in the fixed shaft 91.

The main clutch valve CL will be described below. The fixed shaft 91 has a bypass port 91a defined radially in a peripheral wall thereof and providing communication between the first and second oil passages La, Lb. The main clutch valve CL has a cylindrical main clutch valve body 95 inserted in the hollow space in the fixed shaft 91. The valve body 95 is rotatable relatively to the fixed shaft 91 and has a bypass hole 95a defined therein and positionable in overlapping position with the bypass port 91a. The valve body 95 has an arm 95b on its right-hand end. By turning the arm 95b, the valve body 95 is angularly moved about its own axis to adjust the degree to which the bypass port 91a and the bypass hole 95a are overlapped. The size of the overlapping opening of the bypass port 91a and the bypass hole 95a corresponds to the opening of a bypass passage between the first and second oil passages La, Lb. Accordingly, the opening of the bypass passage can be controlled from the fully open condition to the fully closed condition by turning the valve body 95. When the bypass passage is fully open, working oil discharged from the pump discharge port 81a into the first oil passage La flows from the bypass port 91a and the bypass hole 95a directly into the second oil passage Lb and also into pump inlet port 82a.

Therefore, the hydraulic motor M is disabled, and the clutch is in an "OFF" condition. Conversely, when the bypass passage is fully closed, the clutch is in an "ON" condition.

The direct clutch valve DC is disposed in the hollow space in the main clutch valve body 95. The direct clutch valve DC comprises a piston shaft 85 axially movably disposed in the valve body 95, a shoe 86 mounted on an inner end of the piston shaft 85, and a pilot spool 84 axially slidably inserted in the piston shaft 85. By axially moving the pilot spool 84, the supply of oil pressure from the oil passage La into oil chamber 87a, 87b is controlled to cause the piston shaft 85 to move axially while catching up with the pilot spool 84. For example, when the pilot spool 85 is moved to the left, the piston shaft 85 is also moved to the left to enable the shoe 86 to close the pump discharge passage which is open at the confronting end face of the distribution disc 80, thus blocking off the first oil passage La. With the pump discharge passage thus closed, the pump plungers 62 are hydraulically locked, and the hydraulic pump P and the hydraulic motor M are directly coupled to each other.

The hydraulic pump P and the hydraulic motor M are directly coupled to each other when the swash plate member 73 of the motor M is in an upright position in which the speed reduction ratio is minimum, i.e., indicating a "TOP" position. By directly coupling the hydraulic pump P and the hydraulic motor M to each other, the efficiency of power transmission from the input shaft 1 to the output shaft 2 is increased, and the thrusting force applied to the swash plate member 73 by the motor plungers 72 is reduced, thus reducing the frictional resistance and loads on the bearings.

Figure 4:
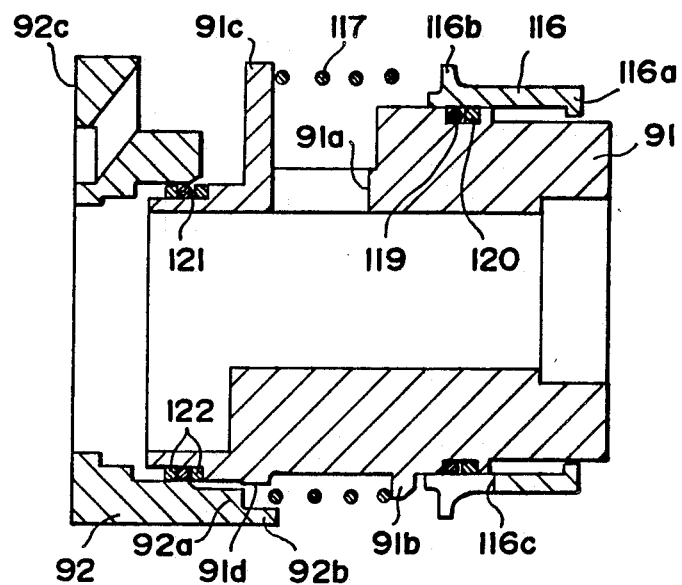
FIG. 4 is an enlarged cross-sectional view of a distribution ring and a fixed seal member which are mounted on a fixed shaft.

An end face seal structure for sealing the end of the motor cylinder 70 will be described below with reference to FIGS. 3 and 4.

The fourth segment 70d of the motor cylinder 70 is rotatable relatively to the fixed shaft 91. A mechanical seal assembly 118 is disposed between the second tubular portion 112 of the fourth segment 70d and the fixed shaft 91, the mechanical seal assembly 118 comprising a rotatable seal member 115, a fixed seal member 116, and a spring 117. The rotatable seal member 115 comprising an annular metal seal member which is fixed to a corner between the second tubular portion 112a and an annular ridge 112 on the inner peripheral surface thereof, and which is rotatable in unison with the second tubular portion 112. The fixed seal member 116 is annular or tubular in shape, and is disposed between the second tubular portion 112 and the fixed shaft 91 and axially movably fitted over the fixed shaft 91, but nonrotatable therearound. The fixed seal member 116 has a radially inward flange 116a on one axial end thereof and a radially outward flange 116b on the other axial end thereof. The radially inward flange 116a has an end face held in slidable contact with an end face of the rotatable seal member 115.

The axial end of the fixed seal member 116 on which the radially outward flange 116b is disposed has a plurality of recesses 116c defined therein, and a plurality of teeth 91b on the outer circumferential surface of the fixed shaft 91 are projected respectively in the recesses 116c. An O-ring 119 and a backup ring 120 are disposed between the fixed seal member 116 and the fixed shaft 91. The spring 117 comprises a compression spring having one end abutting against the radially outward flange 116b of the fixed seal member 116.

The other end of the spring 117 is abutting against the distribution ring 92. The distribution ring 92 is axially movably fitted over an eccentric outer circumferential surface of the lefthand end of the fixed shaft 91, and has a plurality of teeth 92a integrally formed with the righthand end thereof. The fixed shaft 91 has an integral flange 91c which has a diameter larger the inside diameter of the spring 117. The flange 91c has plurality of recesses 91d defined in its outer circumferential edge. The distribution ring 92 is fitted over the fixed shaft 91 such that the teeth 92a of the distribution ring 92 project through the respective recesses 91d in the fixed shaft 91.

With the parts assembled as shown in FIG. 3, the other end of the spring 117 abuts against the teeth 92a of the distribution ring, but is spaced from the flange 91c of the fixed shaft 91. The teeth 92a have distal ends projecting as guides 92b for preventing the spring 117 from being dislodged. An O-ring 121 and backup rings 122 are disposed between the fixed shaft 91 and the distribution ring 92.

In the mechanical seal assembly 118 thus constructed, a preload F1 is axially imposed on the radially outward flange 116b by the spring 117, a reactive force F2 is applied to the radially outward flange 116b due to the oil pressure in the outer oil chamber (the second oil passage Lb), and a separating force F3 owing to the oil pressure is applied to the radially inward flange 116a. The oil pressure in the outer oil chamber (the second oil chamber Lb) is increased when the motor vehicle is decelerated, and is reduced when the motor vehicle is accelerated. A pushing force (F1−F2) which is generated depending on the magnitude of that oil pressure and the separating force F3 are kept in equilibrium to keep an optimum clearance at all times between the radially inward flange 116a of the fixed seal member 116 and the rotatable seal member 115. Even if the oil pressure in the outer oil chamber (the second oil passage Lb) varies, no oil leakage and no seizure-induced wear are caused, and the mechanical seal assembly 118 provides a reliable seal.

The spring 117 which preloads the fixed seal member 116 doubles as a spring for preloading the distribution rings 92. Accordingly, any dedicated spring which would otherwise be required to preload the distribution ring 92 only is not necessary. For this reason, the number of necessary parts is reduced, and so is the cost of the entire structure. The transmission T can thus be assembled with ease, and any space needed to install the springs is reduced in size.

The spring 117 is arranged such that it exerts preloads to the fixed seal member 116 and the distribution ring 92 only when they are fully assembled on the fixed shaft 91. More specifically, as illustrated in FIG. 4, since the fixed shaft 91 has the teeth 91b and the flange 91c, the spring 117 is inserted between the teeth 91b and the flange 91c while they are being assembled together, so that the spring 117 is limited in its extension stroke. The biasing force of the spring 117 is not applied to the fixed seal member 116 and the distribution ring 92 because of its limited extension stroke until they are fully assembled. As a consequence, during the assembling process, the fixed seal member 116 is prevented from being pushed out past the O-ring 119 and the backup ring 120, and the distribution ring 92 is prevented from being pushed out past the O-ring 121 and the backup rings 122.

When the teeth 91b of the fixed shaft 91 are inserted into the recesses 116c in the fixed seal member 116, one end of the spring 117 is held against the radially outward flange 116b and also spaced from the teeth 91b. When the teeth 92a of the distribution ring 92 are inserted into the recesses 91d in the flange 91c, the other end of the spring 117 is held against the teeth 92a while being spaced from the flange 91c. Therefore, after the parts have fully been assembled together, the fixed seal member 116 and the distribution ring 92 are preloaded by the spring 117 as shown in FIG. 4.

With the present invention, as described above, the hollow fixed shaft inserted in the tubular portion divides the interior space in the tubular portion into two oil chambers or passages of the closed hydraulic circuit. The rotatable and fixed seal members of the mechanical seal assembly are disposed between the tubular portion and the fixed shaft to provide a seal therebetween. The contacting end faces of the rotatable and fixed seal members are preloaded by the spring which applies axial biasing forces. Therefore, irrespective of the magnitude of the oil pressure in the closed hydraulic circuit, the mechanical seal assembly provides reliable sealing action without oil leakage and seizure-induced wear.

Inasmuch as the spring doubles as a spring for preloading the distribution ring of the closed hydraulic circuit, the number of necessary parts is reduced, the space for installation is small, and the parts can be assembled with ease.

Although a certain preferred embodiment has been shown and described, it should be understood that many changes and modifications may be made therein without departing from the scope of the appended claims.

What is claimed is:

1. A hydraulically operated continuously variable transmission comprising:
   an input shaft;
   a hydraulic pump coupled to said input shaft;
   an output shaft;
   a hydraulic motor coupled to said output shaft;
   a closed hydraulic circuit hydraulically interconnecting said hydraulic pump and said hydraulic motor such that said hydraulic motor can be driven by hydraulic forces from said hydraulic pump;
   said hydraulic motor having a motor cylinder including an integral tubular member;
   a distribution disc coupled to said cylinder at one end of said tubular member and having oil passages defined therein and communication with said hydraulic pump and said hydraulic motor;
   a hollow fixed shaft inserted in said tubular member;
   a distribution ring axially movably mounted on said fixed shaft and having an end face held in slidable contact with said distribution disc, said distribution ring dividing the hollow space in said tubular member into an inner space inside of said fixed shaft and an outer space outside of said fixed shaft, said inner and outer spaces being part of said closed hydraulic circuit;
   an annular rotatable seal member of end-face seal type rotatably disposed in the other end of said tubular member and extending around said fixed shaft;
   an annular fixed seal member disposed adjacent to an axial end face of said rotatable seal member and axially movably mounted on and extending around said fixed shaft; and a compression spring disposed between said fixed seal member and said distribution ring and resiliently extensible for applying a preload to abut an axial end face of said fixed seal member against said axial end face of said rotatable seal member and a preload to abut said end face of said distribution ring against said distribution disc.

2. A hydraulically operated continuously varible transmission according to claim 1, wherein said hydraulic pump comprises a fixed-displacement swash-plate axial-plunger hydraulic pump, and said hydraulic motor comprises a variable-displacement swash-plate axial-plunger hydraulic motor.

3. A hydraulically operated continuously variable transmission according to claim 1, wherein said rotatable seal member comprises a metal seal member and is rotatable in unison with said tubular member.

4. A hydraulically operated continuously variable transmission according to claim 1, wherein said fixed seal member is in the shape of a tubular member and is nonrotatably mounted on said fixed shaft.

5. A hydraulically operated continuously variable transmission according to claim 1, wherein said rotatable and fixed seal members which are pressed against each other by said compression spring provide a seal for preventing oil in said outer space from leaking out.

* * * * *